United States Patent
Motohama et al.

(10) Patent No.: US 8,484,452 B2
(45) Date of Patent: Jul. 9, 2013

(54) MULTI-OPERATING SYSTEM (OS) BOOTING APPARATUS, MULTI-OS BOOTING PROGRAM, RECORDING MEDIUM, AND MULTI-OS BOOTING METHOD

(75) Inventors: Tsutomu Motohama, Tokyo (JP); Yoshiaki Katayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 341 days.

(21) Appl. No.: 12/922,458

(22) PCT Filed: Feb. 25, 2009

(86) PCT No.: PCT/JP2009/053394
§ 371 (c)(1),
(2), (4) Date: Sep. 14, 2010

(87) PCT Pub. No.: WO2009/113394
PCT Pub. Date: Sep. 17, 2009

(65) Prior Publication Data
US 2011/0022832 A1    Jan. 27, 2011

(30) Foreign Application Priority Data
Mar. 14, 2008    (JP) .................................. 2008-065910

(51) Int. Cl.
*G06F 9/00* (2006.01)
*G06F 9/24* (2006.01)
*G06F 15/177* (2006.01)

(52) U.S. Cl.
USPC .................................. 713/2; 713/1; 713/100

(58) Field of Classification Search
USPC ................................................... 713/1, 2, 100
See application file for complete search history.

(56) References Cited

U.S. PATENT DOCUMENTS 5,771,064 A * 6/1998 Lett ............................... 725/134
6,615,303 B1    9/2003 Endo et al.
(Continued)

FOREIGN PATENT DOCUMENTS

JP    11 149385       6/1999
JP    2000 330806    11/2000
(Continued)

OTHER PUBLICATIONS

Korean Office Action issued Apr. 24, 2012, in Patent Application No. 10-2010-7020422.

(Continued)

*Primary Examiner* — Vincent Tran
(74) *Attorney, Agent, or Firm* — Oblon, Spivak, McClelland, Maier & Neustadt, L.L.P.

(57) ABSTRACT

In a multi-OS booting apparatus, when loading the second OS, contents of the second OS is prevented from being referred to by other programs. The first OS 151 loads the second boot loader 171 and the second OS image 211 into the first memory space 150 by using the first boot loader 154 (phase 2). The loaded second boot loader 171 configures the third memory space 170 including the first memory space 150 and the second memory space 160, removes the second boot loader 171 itself and the second OS image 211 from the management object of the first OS 151 by letting the second boot loader 171 to operate in the third memory space 170 (phase 3), configures the second memory space 160 in order to load the second OS 161 into it, and boots the second OS 161 in the second memory space 160.

7 Claims, 6 Drawing Sheets

U.S. PATENT DOCUMENTS

| | | | |
|---|---|---|---|
| 6,711,605 B2 | 3/2004 | Sekiguchi et al. | |
| 6,718,482 B2 | 4/2004 | Sato et al. | |
| 6,772,419 B1 | 8/2004 | Sekiguchi et al. | |
| 6,795,912 B1 | 9/2004 | Itoh et al. | |
| 6,963,981 B1* | 11/2005 | Bailey et al. | 726/22 |
| 6,996,828 B1 | 2/2006 | Kimura et al. | |
| 7,409,536 B2* | 8/2008 | Guo et al. | 713/1 |
| 7,712,104 B2 | 5/2010 | Sekiguchi et al. | |
| 2004/0237086 A1* | 11/2004 | Sekiguchi et al. | 718/100 |
| 2005/0182922 A1* | 8/2005 | Guo et al. | 713/1 |
| 2006/0294519 A1 | 12/2006 | Hattori et al. | |
| 2007/0055857 A1* | 3/2007 | Wang | 713/2 |
| 2007/0055860 A1* | 3/2007 | Wang | 713/2 |

FOREIGN PATENT DOCUMENTS

| | | |
|---|---|---|
| JP | 2000 347883 | 12/2000 |
| JP | 2001 100983 | 4/2001 |
| JP | 2001 236237 | 8/2001 |
| JP | 2003 241984 | 8/2003 |
| JP | 2004 303028 | 10/2004 |
| JP | 3863117 | 12/2006 |
| JP | 2007 4661 | 1/2007 |
| JP | 2007 35066 | 2/2007 |
| JP | 2008 46887 | 2/2008 |

OTHER PUBLICATIONS

International Search Report issued May 26, 2009 in PCT/JP09/053394 filed Feb. 25, 2009.

Office Action issued Feb. 13, 2013 in German Patent Application No. 11 2009 000 612.4 (with English-language Translation), 15 pages.

* cited by examiner

MULTI-OPERATING SYSTEM (OS) BOOTING APPARATUS, MULTI-OS BOOTING PROGRAM, RECORDING MEDIUM, AND MULTI-OS BOOTING METHOD

TECHNICAL FIELD

The present invention relates to a multi-OS booting apparatus and multi-OS booting program for booting a plurality of operating systems (operating system, hereinafter also called an OS).

BACKGROUND ART

In recent years, with the development of high performance computers, running a plurality of operating systems on one computer has attracted attention, For example, it is possible in one computer to realize a highly functional system which takes advantage of each OS, by simultaneously operating a real-time OS for running a control program and a general-purpose OS, such as Windows (registered trademark) and Linux (registered trademark), having multiple functions and abundant software resources. Originally, these OSs are designed in consideration that one OS operates on one computer. Therefore, in order to let a plurality of OSs coexist on one computer, it becomes necessary to operate such that computer resources (memory, I/O (Input/Output) device, etc.) managed by each OS are not destroyed. For example, when booting the second OS after having booted the first OS, there is a need of a boot loader for exclusive use for booting the second OS without destroying the memory area of the first OS which has previously been activated. As a method for realizing these, there has been developed the technique of Patent literature 1, etc.
[Patent Literature 1]
  Japanese Patent Laid Open Publication No. 11-149385

DISCLOSURE OF THE INVENTION

Problems to be Solved by the Invention

However, in the case of the aforementioned method, since the first memory space has been extended so that the second memory space, which only the second OS should essentially manage, can be temporarily read and written from the first OS in order to load the second OS, thereby a problem exists that there is a possibility of referring to the contents or altering programs and data of the second OS from other programs which run on the first OS or from the first OS.

That is, the first OS can temporarily read and write the second memory space. Thus, there is a problem that the first OS can refer to the data processed by the second OS or can falsify the data processed by the second OS, by performing some sort of processing to the second memory space which only the second OS should manage.

This is fatal when the second OS implements important programs, such as a control program and a cryptographic program. The present invention has been made to solve the problem as described above, and it is an object to enhance the security, when loading the second OS, by preventing the contents of the second OS from being referred to or altered by other programs operating on the first OS.

Means to Solve the Problems

A multi-OS booting apparatus according to the present invention, which boots at least two operating systems (operating system hereinafter called an OS) of a first OS and a second OS, includes:

(1) a primary storage unit having a memory area with respect to which a memory space is defined;

(2) a secondary storage unit for storing a second boot loader and the second OS;

(3) an OS execution unit for causing a first boot loader to perform loading the second boot loader and the second OS from the secondary storage unit into the memory area of the primary storage unit, which is defined as a first memory space managed by the first OS with respect to the primary storage device by a first context, wherein the loading is performed by running the first boot loader, which is to run under the first OS that operates in the first context being a context indicating control information for a CPU (Central Processing Unit) and being a context for the first OS, under the first OS operating in the first context; and (4) a loader execution unit for causing the second boot loader to generate a context for the second boot loader, which defines a third memory space with respect to the primary storage unit, wherein the third memory space includes a memory area defined as a second memory space managed by the second OS and a memory area where the second boot loader and the second OS have been loaded, and to perform switching from the first context to the context generated for the second boot loader, by executing the second boot loader, which has been loaded into the memory area defined as the first memory space, under the first OS operating in the first context, for causing the second boot loader to load the second OS, which has been loaded into the memory area of the primary storage unit by the first boot loader, into the memory area of the primary storage unit defined as the second memory space included in the third memory space, and to generate a context for the second OS, by executing the second boot loader in the context for the second boot loader, and for causing the second boot loader to perform switching from the context for the second loader to the context generated for the second OS, and to boot the second OS in the context for the second OS.

It is characterized in that the second OS stored in the secondary storage unit has been encrypted, the second boot loader stored in the secondary storage unit has a function of decrypting an encrypted second OS, and the loader execution unit causes the second boot loader to decrypt the encrypted second OS which has been loaded into the memory area of the primary storage unit by the first boot loader, and to load a decrypted second OS into the memory area of the primary storage unit defined as the second memory space included in the third memory space, by executing the second boot loader in the context for the second boot loader.

It is characterized in that the second boot loader stored in the secondary storage unit has a function of checking for falsification of the second boot loader, and the loader execution unit causes the second boot loader to determine whether the second boot loader itself has been falsified, by executing the second boot loader under the first OS operating in the first context.

It is characterized in that the second boot loader stored in the secondary storage unit has a function of checking for falsification of the second OS, and the loader execution unit causes the second boot loader to determine whether the second OS, which has been loaded into the memory area of the primary storage unit by the first boot loader, has been falsified, by executing the second boot loader in the context for the second boot loader.

It is characterized in that the second boot loader stored in the secondary storage unit has a function of checking whether the second OS is a duplicate, and the loader execution unit causes the second boot loader to determine whether the second OS, which has been loaded into the memory area of the primary storage unit by the first boot loader, has been altered, by executing the second boot loader in the context for the second boot loader.

A multi-OS booting program according to the present invention that causes a computer which boots at least two operating systems (operating system hereinafter called an OS) of a first OS and a second OS to function as:

(1) a primary storage unit having a memory area with respect to which a memory space is defined;

(2) a secondary storage unit for storing a second boot loader and the second OS;

(3) an OS execution unit for causing a first boot loader to perform loading the second boot loader and the second OS from the secondary storage unit into the memory area of the primary storage unit, which is defined as a first memory space managed by the first OS with respect to the primary storage device by a first context, wherein the loading is performed by running the first boot loader, which is to run under the first OS that operates in the first context being a context indicating control information for a CPU (Central Processing Unit) and being a context for the first OS, under the first OS operating in the first context; and (4) a loader execution unit for causing the second boot loader to generate a context for the second boot loader, which defines a third memory space with respect to the primary storage unit, wherein the third memory space includes a memory area defined as a second memory space managed by the second OS and a memory area where the second boot loader and the second OS have been loaded, and to perform switching from the first context to the context generated for the second boot loader, by executing the second boot loader, which has been loaded into the memory area defined as the first memory space, under the first OS operating in the first context, for causing the second boot loader to load the second OS, which has been loaded into the memory area of the primary storage unit by the first boot loader, into the memory area of the primary storage unit defined as the second memory space included in the third memory space, and to generate a context for the second OS, by executing the second boot loader in the context for the second boot loader, and for causing the second boot loader to perform switching from the context for the second loader to the context generated for the second OS, and to boot the second OS in the context for the second OS.

A multi-OS booting method according to the present invention, performed by a multi-OS booting apparatus that includes a primary storage unit having a memory area with respect to which a memory space is defined, and boots at least two operating systems (operating system hereinafter called an OS) of a first OS and a second OS, includes:

(1) storing a second boot loader and the second OS by a secondary storage unit;

(2) causing a first boot loader, by an OS execution unit, to perform loading the second boot loader and the second OS from the secondary storage unit into the memory area of the primary storage unit, which is defined as a first memory space managed by the first OS with respect to the primary storage device by a first context, wherein the loading is performed by running the first boot loader, which is to run under the first OS that operates in the first context being a context indicating control information for a CPU (Central Processing Unit) and being a context for the first OS, under the first OS operating in the first context; and (3) causing the second boot loader, by a loader execution unit, to generate a context for the second boot loader, which defines a third memory space with respect to the primary storage unit, wherein the third memory space includes a memory area defined as a second memory space managed by the second OS and a memory area where the second boot loader and the second OS have been loaded, and to perform switching from the first context to the context generated for the second boot loader, by executing the second boot loader, which has been loaded into the memory area defined as the first memory space, under the first OS operating in the first context, causing the second boot loader to load the second OS, which has been loaded into the memory area of the primary storage unit by the first boot loader, into the memory area of the primary storage unit defined as the second memory space included in the third memory space, and to generate a context for the second OS, by executing the second boot loader in the context for the second boot loader, and causing the second boot loader to perform switching from the context for the second loader to the context generated for the second OS, and to boot the second OS in the context for the second OS.

Effects of the Invention

According to the present invention, when loading the second OS, processing is performed by the second boot loader which operates in the third memory space independent of the first OS, and thus it becomes possible to prevent the second memory space from being accessed by a program which operates on the first OS, thereby enhancing the security of the second OS.

BEST MODE FOR CARRYING OUT THE INVENTION

Embodiment 1

Figure 1:
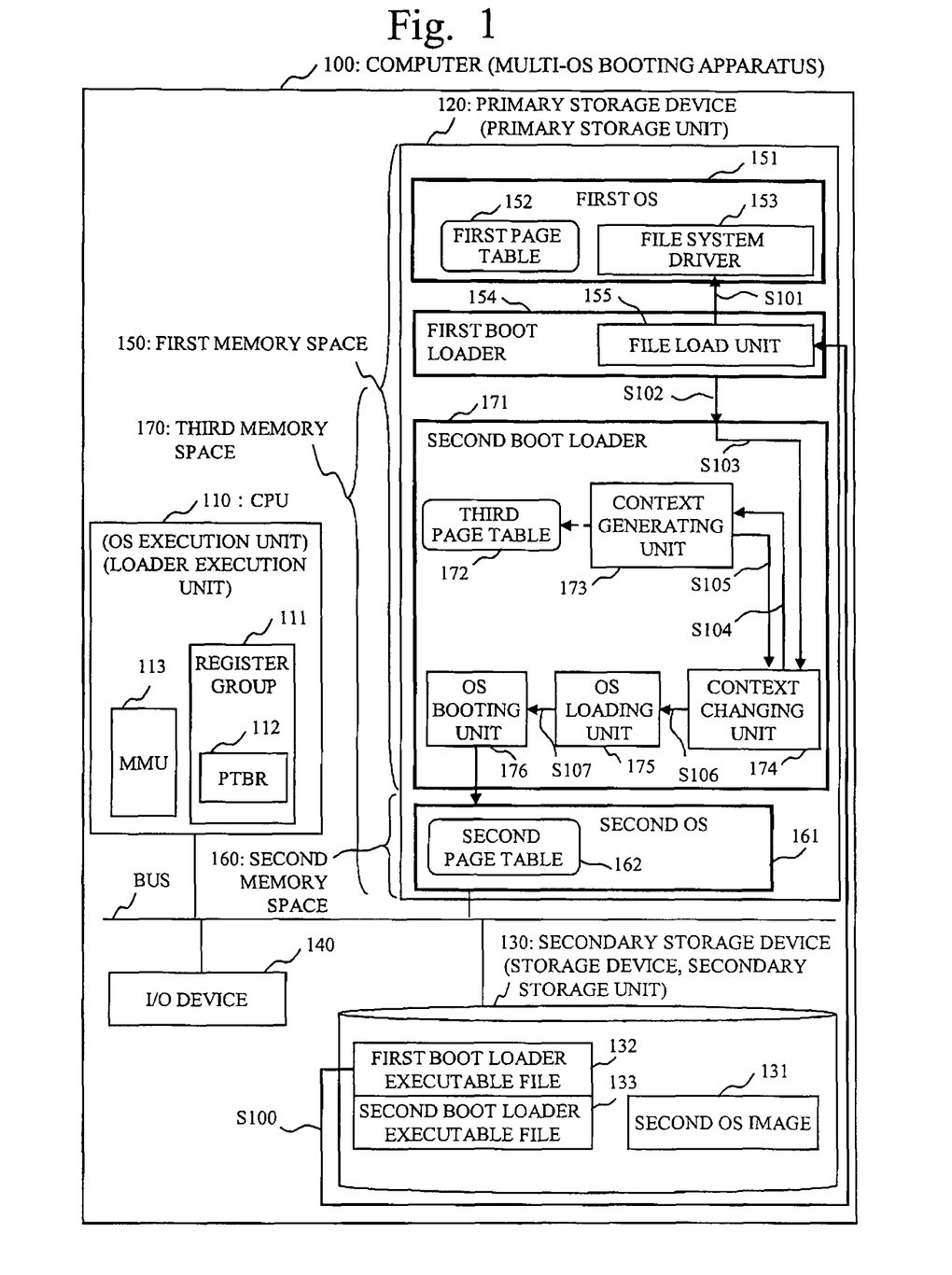
FIG. 1 shows a configuration diagram of a multi-OS booting apparatus according to Embodiment 1.

FIG. 1 shows a configuration diagram of a multi-OS booting apparatus to be realized as a computer 100 according to Embodiment 1. The computer 100 (multi-OS booting apparatus) according to Embodiment 1 loads the second OS into a space different from that of the first OS through dividing the loading of the second OS into two stages so that the contents of the second OS cannot be referred to from the first OS.

In FIG. 1, the computer 100 includes a CPU (Central Processing Unit) 110 (an OS execution unit, a loader execution unit), a primary storage device 120 (primary storage unit) for storing data and programs, a secondary storage device 130 (secondary storage unit) such as a FlashROM and a hard disk, and an I/O device 140.

(CPU)

(1) The CPU 110 includes a register group 111, a PTBR (Page Table Base Register) 112, and an MMU (Memory Management Unit) 113. The PTBT 112 is one of the register group 111, and designates the head physical address of a page table. The MMU achieves conversion between a logical address and a physical address in accordance with a setup of the page table designated by the PTBR 112 when the CPU 110 accesses the primary storage device 120.

(2) The "page table" is the one in which a correspondence table between logical addresses and physical addresses is described, and when a certain command accesses a logical address whose correspondence with respect to a physical address is not described in the page table, the MMU 113 has a function of generating an exception and notifying the CPU 110 of it. This exception is processed by the OS, for example, to find out the corresponding physical address, rewrite the correspondence table of the page table, and re-execute the command which caused the exception to generate.

(Primary Storage Device 120)

In the primary storage device 120, there are defined three memory spaces: a first memory space 150, a second memory space 160, and a third memory space 170, each having a physical address area assigned to the OS or a program. In these memory spaces, there exist page tables managed by the OS or the program. The OS or the program performs matching of a logical address only with a physical address of the memory space which the OS or the program itself manages. That is, the OS or the program cannot access a memory space other than its own managing memory space. For example, since the first OS, to be described below, manages only the first memory space 150, it can access only the first memory space 150, and cannot access the second memory space 160 and the third memory space 170, to be described later.

Next, memory spaces, and an OS and programs which operate in each memory space will be explained. Although an OS is also a program, the term "program" herein is an object of execution by the OS.

(First Memory Space 150)

(1) The first memory space 150 is a memory space where a first OS 151 operates. As described above, the first OS 151 manages only the first memory space 150. A first page table 152 is managed by the first OS 151. In the first page table 152, there is described a configuration of the first memory space 150.

(2) A file system driver 153 is a function provided by the first OS 151, and supplies a means to access a file stored in the secondary storage device 130.

(3) A first boot loader 154 is a "privileged mode program" which operates in the first OS 151, and a first boot loader executable file 132 is stored in the secondary storage device 130. The "privileged mode program" indicates a program that can access all the resources of the computer, such as a device driver in a kernel mode. The first boot loader 154 includes a file load unit 155 that loads a second OS image 131 and a second boot loader executable file 133, which are in the secondary storage device 130, into the first memory space by using the file system driver 153.

(Second Memory Space 160)

The second memory space 160 is a memory space where a second OS 161 operates. After the second OS 161 is booted, the second memory space 160 is managed by the second OS 161 as described later. A second page table 162 is managed by the second OS 161. In the second page table 162, there is described a configuration of the second memory space 160 where the second OS is booted.

(Third Memory Space 170)

The third memory space 170 is a memory space where a second boot loader 171 operates. A third page table 172 is managed by the second boot loader 171. The second boot loader 171 manages the third memory space 170. In the third page table 172, there is described a configuration of the third memory space 170. The third memory space 170 includes the second memory space 160, which will be described later with reference to FIG. 2. The second boot loader 171 is a program activated by the first boot loader 154 and performs processing for booting the second OS 161.

(Configuration of Second Boot Loader 171)

The second boot loader 171 includes the third page table 172, a context generating unit 173, a context changing unit 174, an OS loading unit 175, and an OS booting unit 176.

(1) The context generating unit 173 generates a context for the second boot loader.

(2) The context changing unit 174 sets the context generated by the context generating unit 173, to the register group 111 of the CPU 110. The term "context" herein indicates a memory area, such as a page table and a stack area, which is necessary for the register group 111 of the CPU 110 or for setting the register group 111.

(3) The OS loading unit 175 loads the second OS image, which has been loaded into the first memory space by the first boot loader 154, into the second memory space.

(4) The OS booting unit 176 boots the second OS.

Figure 2:
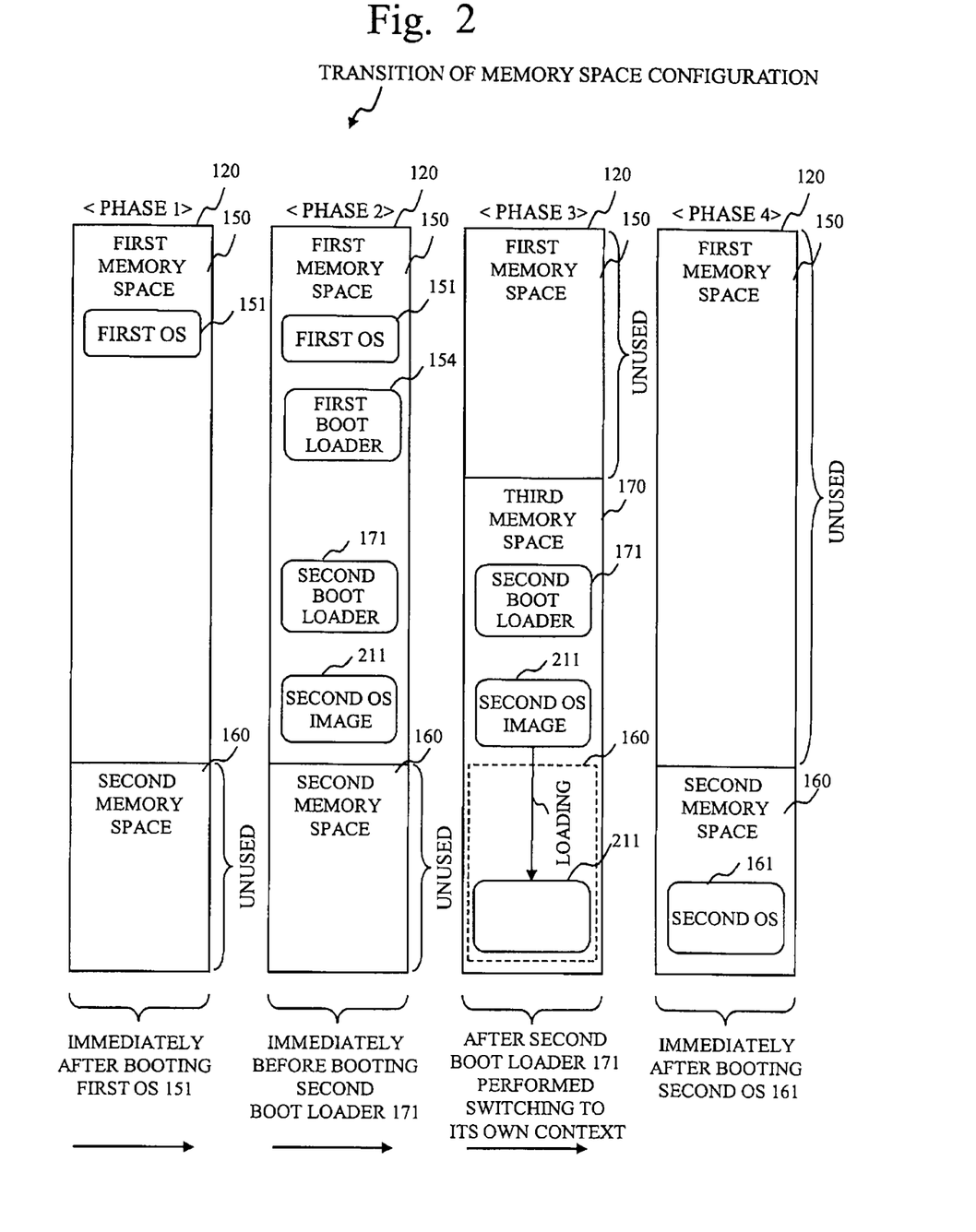
FIG. 2 shows transition of configuration of a memory space according to Embodiment 1.

Next, operations will be described. FIG. 2 shows transition of the configuration of the first memory space 150. Phase 1 to Phase 4 of FIG. 2 illustrate configurations of the memory space of the primary storage device 120, up to booting the second OS 161. The memory space depicted as "unused" indicates a memory space which cannot be referred to from the OS or a program currently operating.

(1) The phase 1 is the memory space immediately after the first OS 151 is booted.

(2) The phase 2 is the memory space immediately before the second boot loader 171 is booted.

(3) The phase 3 is the memory space after the second boot loader 171 performs switching to its own context. Therefore, the second boot loader 171 cannot refer to the first memory space 150.

(4) The phase 4 is the memory space after the second OS 161 is booted. The second memory space 160 cannot be referred to from the first OS 151 or a program (for example, the first boot loader 154) executed by the first OS 151.

Figure 3:
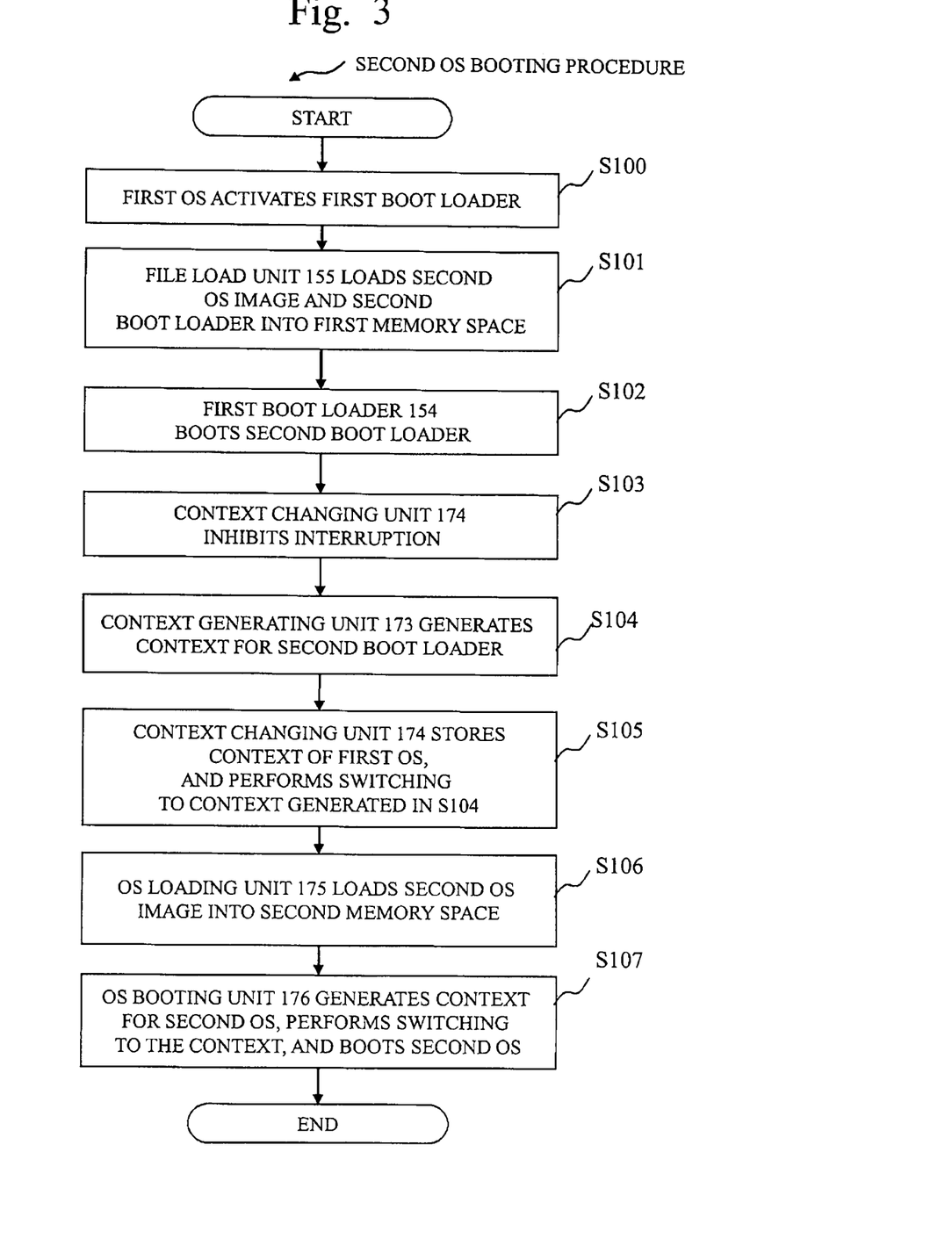
FIG. 3 is a flowchart illustrating a multi-OS booting apparatus according to Embodiment 1.

FIG. 3 is a flowchart illustrating a booting procedure of the second OS 161. That is, the flowchart describes the process from the phase 1 to the phase 4 of FIG. 2. With reference to FIGS. 2 and 3, operations up to booting the second OS will be explained.

(Phase 1)

In the Initialization Processing at the Time of Booting, the first OS 151 treats the second memory space 160, which is to be used by the second OS 161, as reserved, and manages only the first memory space 150. The first OS 151 preliminarily holds configuration information on the second memory space to be used for configuring the second memory space 160.

The reserved second memory space 160 is the area where the second OS 161 will be booted in the phase 4. Therefore, a necessary amount for booting and operating the second OS is secured in the second memory space 160.

With regard to securing a memory area, OS usually acquires the amount of the primary storage device installed in the computer from the BIOS (Basic Input/Output System), etc. built in the computer. At this time, the OS initializes the memory management routine of the OS such that all the areas of the primary storage device are used. In order for the first OS 151 not to monopolize the primary storage device in the phase 1 of FIG. 2, it can be realized by a method, such as the following (1) to (3).

(1) One is to rewrite the memory management routine of the OS so that a value obtained by subtracting the second memory space, instead of an actual value, may be used as the amount of the primary storage acquired from the BIOS.

(2) Another is, when there is an option of specifying the amount of the primary storage device as a boot parameter of the OS, to specify a value obtained by subtracting the second memory space from the amount of the primary storage device actually installed.

(3) Another is to create an emulation layer of the BIOS and return a value obtained by subtracting the second memory space.

In the latter two cases, the present Embodiment can be applied without changing the first OS. Owing to these means, the first OS 151 can operate on supposition that only the first memory space 150 exists in the primary storage device 120.

(Phase 2)

Next, with reference to the flowchart of FIG. 3, a procedure of building the configuration of the primary storage device 120 shown in the phase 2 of FIG. 2 will be explained. As mentioned above, the phase 2 of FIG. 2 is immediately before the second boot loader 171 is booted. The phase 2 of FIG. 2 shows a state where the first memory space 150 is managed by the first OS 151.

(S100)

The First OS Activates the First Boot Loader Executable file 132 stored in the secondary storage device 130, as a program in the privileged mode which operates on the first OS 151 (S100). The first boot loader executable file 132 loaded into the first memory space 150 serves as the first boot loader 154. Next, the file load unit 155 of the first boot loader 154 loads the second OS image 131 and the second boot loader executable file 133 from the secondary storage device 130 into a partial space (subspace) of the first memory space 150 by using the file system driver 153 which is a function provided by the first OS 151 (S101). Those loaded into the first memory space 150 serve as the second boot loader 171 and a second OS image 211. Owing to these means, the configuration of the primary storage device 120 shown in the "phase 2" of FIG. 2 is built up. The second OS image 211 loaded by the file load unit 155 of the first boot loader 154 is binary information of the image file loaded as it is into the first memory space 150, and actual booting of the second OS 161 in the second memory space 160 is performed by the second boot loader 171.

(Phase 3)

Next, a procedure of building the configuration of the primary storage device 120 shown in the "phase 3" of FIG. 2 will be explained. As described above, the phase 3 of FIG. 2 is after the second boot loader 171 performs switching to its own context. The first boot loader 154 boots the second boot loader 171 which has been loaded into the first memory space 150 (S102).

(After Booting Second Boot Loader 171)

After the second boot loader 171 is booted, the subject of the operation moves to the second boot loader 171.

The following operation is performed by the second boot loader 171. The context changing unit 174 of the second boot loader 171 inhibits interruption in order to take the control authority over the CPU 110 from the first OS 151 (S103). At this stage, since the second boot loader 171 operates in the context of the first OS, there is a possibility of the processing being taken by the first OS 151 due to interruption of the system clock or the I/O device. In order to prevent this, the context changing unit 174 of the second boot loader 171 inhibits interruption. Next, the context generating unit 173 of the second boot loader 171 generates a context for the second boot loader 171 so that the second boot loader 171 may operate in the context for the second boot loader 171 which is independent of the first OS 151 (S104). As one of the contexts to generate, the context generating unit 173 of the second boot loader 171 generates the third page table 172 so that the third memory space 170 may be configured including the memory area of the second boot loader 171 loaded in S101, the memory area of the second OS image 211, and the second memory space 160 as shown in the phase 3 of FIG. 2. In the third page table 172, a relation between the third memory space and the second memory space shown in FIG. 1 (that is, a part of the area of the third memory space serving as the second memory space) is also described. Then, as other contexts to generate, setting of a stack area and a segment area can be cited. The context changing unit 174 of the second boot loader 171 stores the current context information (context information of the first OS), and performs switching of the context by setting the context for the second boot loader 171, which was generated in S104, to the register group 111 (S105). The state of the phase 3 of FIG. 2 is obtained by switching to the context for the second boot loader 171, performed by the context changing unit 174 of the second boot loader 171.

Through the procedures described above, the second boot loader 171 takes the control authority over the CPU 110 from the first OS 151, and operates in the third memory space 170 which is an independent memory space. In the case of returning the control authority to the context of the first OS, when the context changing unit 174 of the second boot loader 171 sets the context for the first OS, which was stored in S105, to the register group 111 and performs switching from the third memory space 170 to the first memory space 150, it becomes possible to return the control authority over the CPU 110 to the first OS 151.

(Phase 4)

Next, a procedure of building the configuration of the primary storage device 120 shown in the "phase 4" of FIG. 2 will be explained. The phase 4 of FIG. 2 is immediately after the second OS is booted in the primary storage device 120. The process from the phase 3 to the phase 4 of FIG. 2 will be described below. The OS loading unit 175 of the second boot loader 171 loads the second OS image 211, which was loaded in S101 by the file load unit 155 of the first boot loader 154, into the second memory space 160 from the third memory space 170 (S106). The second memory space 160 is the area shown in dashed lines in the phase 3 of FIG. 2. That is, "the second OS image 211" shown in the phase 2 of FIG. 2 is the one loaded into the first memory space 150 in S101. With regard to "the second OS image 211" of the phase 3, its existence area has merely been switched from the first memory space 150 to the third memory space 170 by the context, and thus it has not been loaded. In the state of the phase 3 of FIG. 2, the OS loading unit 175 of the second boot loader 171 loads the second OS image 211 into the area of the second memory space 160 in the third memory space 170. The second boot loader 171 holds configuration information on the second memory space, to be used for configuring the second memory space, in the third page table 172 in advance. The second boot loader 171 also holds the correspondence relation between the third memory space 170 and the second memory space included in the third memory space 170 in the state of the phase 3 of FIG. 2, in the third page table 172, as the configuration information on the second memory space. According to this configuration information on the second memory space, the OS loading unit 175 of the second boot loader 171 loads the second OS image 211 existing in the third memory space 170 into the second memory space 160 as shown in the phase 3 of FIG. 2.

The OS booting unit 176 of the second boot loader 171 generates a context for the second OS 161, performs switching to the context and boots the second OS 161 (S107).

The state of the phase 4 of FIG. 2 is immediately after the second OS 161 is booted. In the context for the second OS 161 generated by the OS booting unit 176 of the second boot loader 171, like the context for the second boot loader 171 generated in S104, the second page table 162 described to configure the second memory space 160, a stack area and a segment area are set. The OS booting unit 176 of the second boot loader 171 sets the contents of the context for the second OS, to the register group 111 of the CPU 110. Then, when the OS booting unit 176 of the second boot loader 171 boots the second OS, it becomes the state that the second OS operates in the second memory space.

According to Embodiment 1 as described above, when loading the second OS 161, since the processing is performed by the second boot loader 171 which operates in the third memory space 170 being independent of the first OS 151, it is possible to prevent the second memory space 160 from being accessed from programs operating on the first OS 151, thereby increasing the security against falsification of the second OS 161. Moreover, since the second boot loader 171 utilizes what is loaded by the first boot loader 154 by using the file system driver 153 being a function of the first OS 151, it is unnecessary to install complicated drivers which operate the secondary storage device 130 and file systems, thereby facilitating the installation of the boot loader.

Embodiment 2

Figure 5:
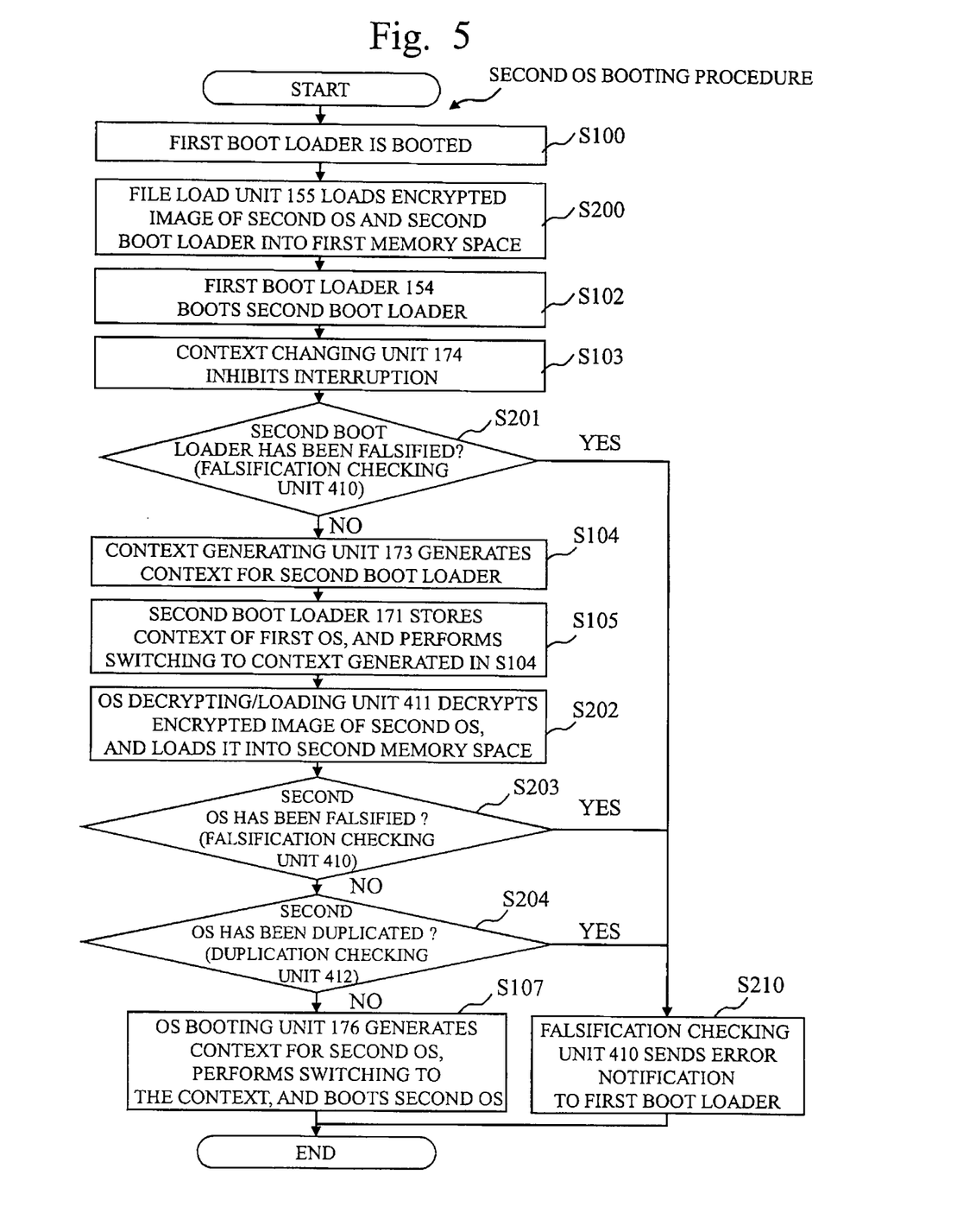
FIG. 5 is a flowchart illustrating a multi-OS booting apparatus according to Embodiment 2.
Figure 6:
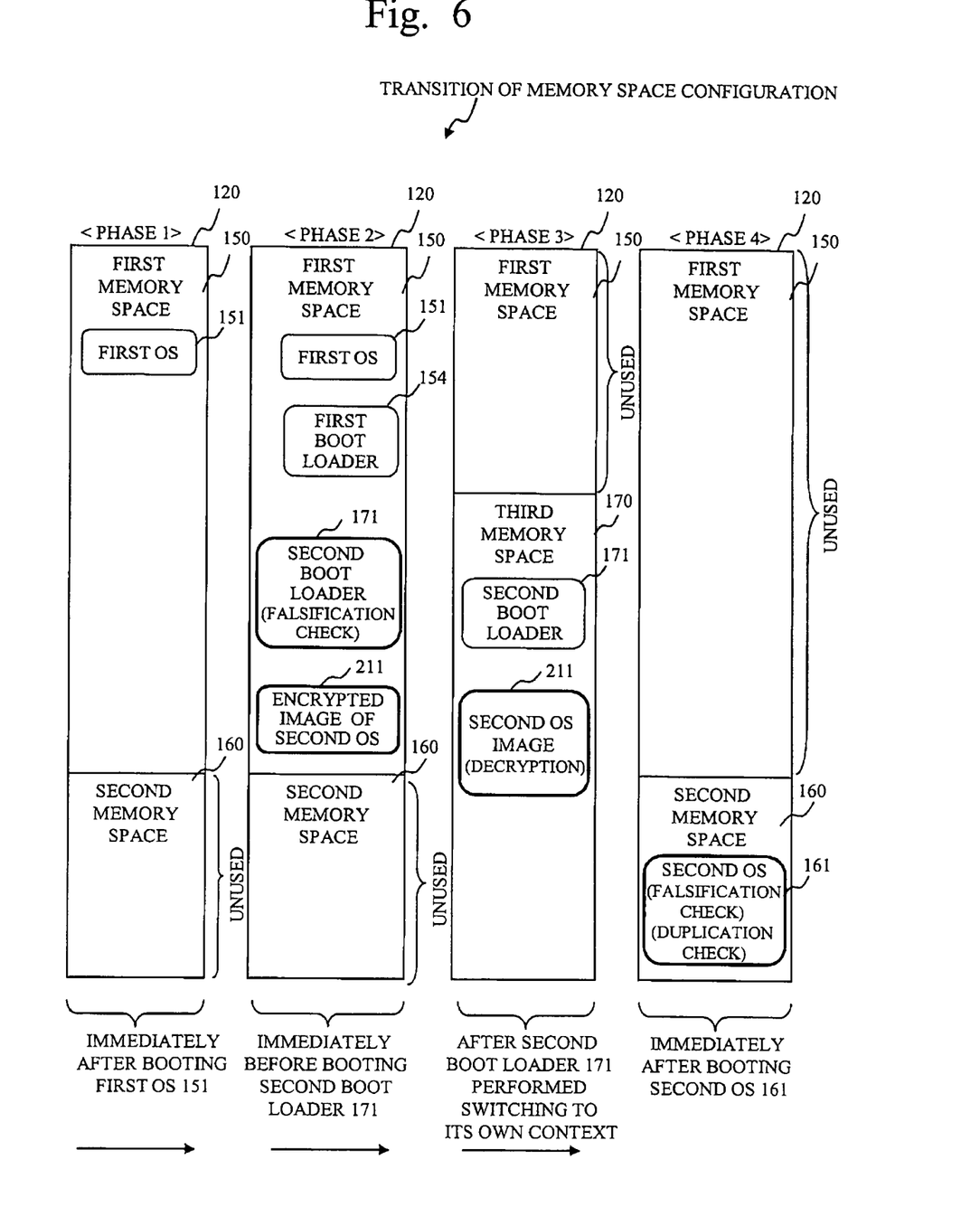
FIG. 6 shows transition of configuration of a memory space according to Embodiment 2.

Embodiment 2 will be described with reference to FIGS. 4 to 6. According to Embodiment 1, when the second OS 161 is loaded, the second memory space 160 is prevented from being accessed from the first OS 151 or a program operating on the first OS 151. According to the following Embodiment, preventing analysis, falsification, or duplication of the second OS image 211 will be described.

Figure 4:
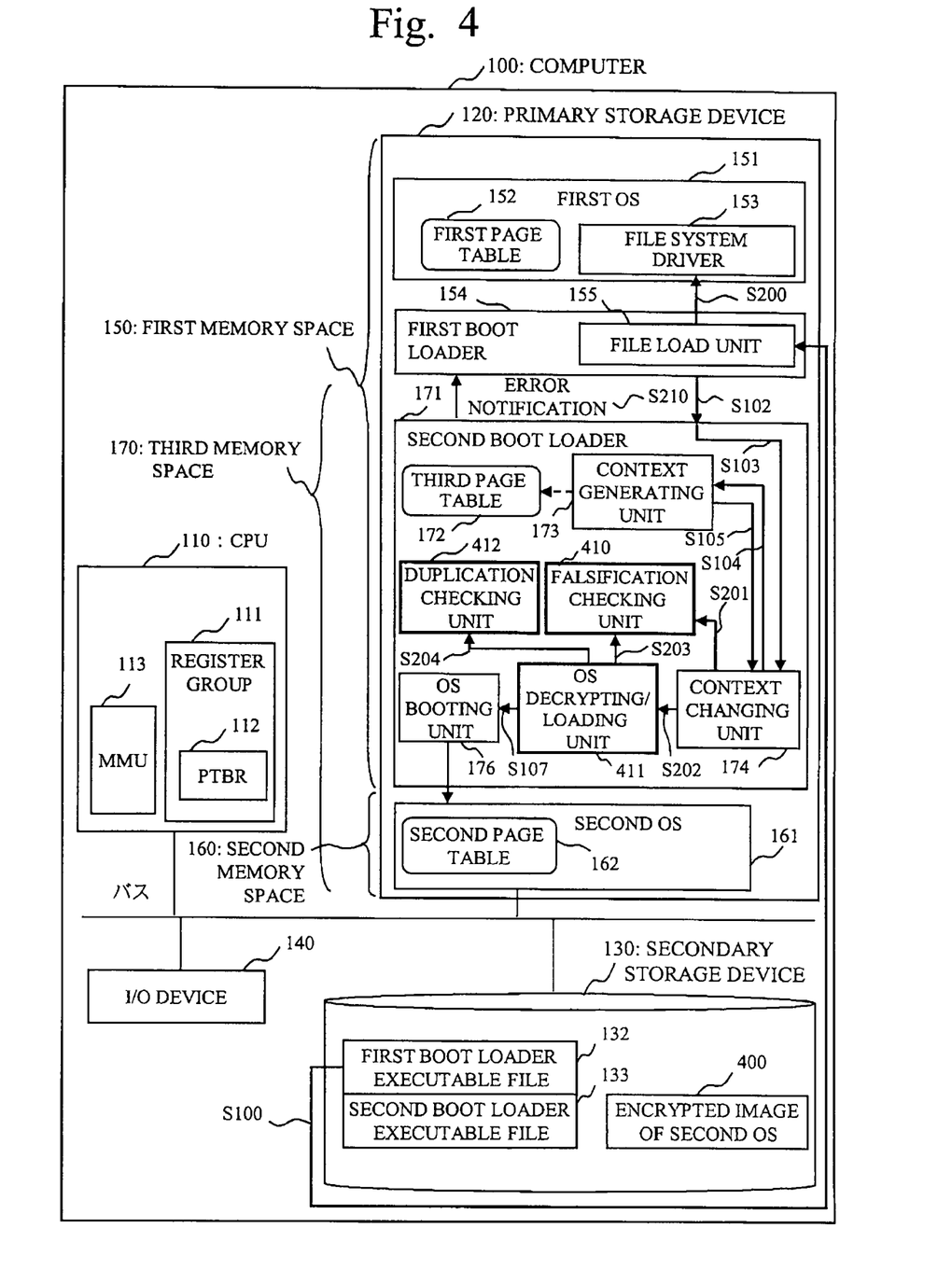
FIG. 4 shows a configuration diagram of a multi-OS booting apparatus according to Embodiment 2.

FIG. 4 shows a configuration diagram of a multi-OS booting apparatus to be realized as the computer 100 according to Embodiment 2, and ones denoted by the same signs as those in FIG. 1 are omitted.

FIG. 4 differs from FIG. 1 with respect to the following points.

(1) An encrypted image 400 of the second OS is stored in the secondary storage device. The encrypted image 400 of the second OS is the one generated by previously encrypting the second OS image 131 by a software maker.

(2) The second boot loader 171 newly includes a falsification checking unit 410 and a duplication checking unit 412, and an OS decrypting/loading unit 411 having a decryption function is provided instead of the OS loading unit 175. The falsification checking unit 410 checks whether the second boot loader 171 has been altered (self-falsification check function), and also checks whether the second OS 161 has been altered (the second OS falsification check function). The OS decrypting/loading unit 411 decrypts the encrypted image 400 of the second OS. The duplication checking unit 412 checks whether the second OS has been fraudulently duplicated by a software user or not (duplication check function).

Next, operations will be explained. FIG. 5 shows a booting procedure of the second OS according to Embodiment 2. FIG. 6 is corresponding to FIG. 2. Explanation is given hereinafter referring to FIGS. 5 and 6. In FIG. 5, since ones denoted by the same signs as those in FIG. 3 are the same processing as those explained in Embodiment 1, their explanation is omitted.

(Phase 2)

The file load unit 155 of the first boot loader 154 loads the encrypted image 400 of the second OS and the second boot loader executable file 133 into the first memory space 150 from the secondary storage device 130, using the file system driver 153 which is a function provided by the first OS 151 (S200). The encrypted image 400 of the second OS is image file's binary data loaded as it is into the first memory space 150 and is in an encrypted state.

(Checking for Falsification of Second Boot Loader 171)

Next, the first boot loader 154 activates the second boot loader 171 (S102). Then, after the context changing unit 174 of the second boot loader 171 inhibits interruption (S103), the falsification checking unit 410 of the second boot loader 171 checks whether its own program (the second boot loader 171) has not been falsified (S201). As an example of the method of checking for falsification of the second boot loader 171 itself: hashed code information of its own program is embedded at the software creation time, and the hash is calculated after the booting. If the calculated hash is not in accordance with the embedded information, it can be detected that falsification has been made (an example of a self-falsification criterion). When detecting the falsification, the falsification checking unit 410 sends an error notification indicating that falsification has been made to the first boot loader 154, and ends the processing (S210).

(Phase 3)

After the second boot loader 171 performs switching to the context for the second boot loader (S105, phase 3 of FIG. 6), the OS decrypting/loading unit 411 of the second boot loader 171 decrypts an encrypted image 510 of the second OS, and loads it into the second memory space 160 (S202).

(Phase 4)

(1. Checking for Falsification of Second OS 161 Loaded Into Second Memory Space)

Next, similar to the checking for falsification of the second boot loader 171 performed in S201, the falsification checking unit 410 of the second boot loader 171 checks whether the second OS 161 has not been falsified (S203). With regard to a criterion of whether falsification has been made or not (second OS falsification criterion), the same method as that of checking for falsification of the second boot loader 171 can be applied. If it is detected that falsification has been made, the falsification checking unit 410 of the second boot loader 171 performs switching to the OS context of the first OS 151 stored in S105, sends an error notification indicating that falsification has been made to the first boot loader 154, and ends the processing (S210).

(2. Checking for Duplication of Second OS 161 Loaded into Second Memory Space)

Next, the duplication checking unit 412 of the second boot loader 171 checks whether the second OS has been fraudulently duplicated or not (S204). As an example of the method of checking for duplication (duplication criterion): information, such as a serial number (e.g., MAC Address of a network card) being information peculiar to the I/O device 140, capacity of the primary storage device 120 or the secondary storage device 130, or a model number of the CPU 110, is embedded in the second OS in advance, and checking is performed based on the embedded information. This enables to detect the execution performed on other than the computer intended by the software maker. By performing the above checking for duplication, if it is detected that duplication has been made, the duplication checking unit 412 of the second boot loader 171 performs switching to the OS context of the first OS 151 stored in S105, sends an error notification indicating that duplication has been made to the first boot loader 154, and ends the processing (S210).

While the encrypted second OS image is used in this Embodiment 2, a compressed second OS image may also be used. In that case, the OS decrypting/loading unit 501 has a function of developing the compressed second OS image, so that it can be realized without changing other means.

According to the present Embodiment 2 as mentioned above, since the second OS image in an encrypted state can be put in the secondary storage device 130 and the first memory space 150, it is possible to prevent the contents of the second OS 161 from being analyzed by other programs which operate on the first OS 151. Moreover, by embedding hashed code information of a program, a serial number of the I/O device, etc., and checking them by the second boot loader 171, it becomes possible to detect falsification and duplication of the program.

Although the multi-OS booting apparatus which is executed by a computer has been explained in Embodiments 1 and 2, such a multi-OS booting apparatus can also be grasped as a method, that is "multi-OS booting method." Moreover, it can also be grasped as a multi-OS booting program which executes the multi-OS booting apparatus described above, and further, can also be grasped as a computer-readable storage medium in which the multi-OS booting program is recorded. Furthermore, the multi-OS booting apparatus can also be grasped as a "multi-OS booting system."

In Embodiments described above, operations of the programs, such as the first OS 151, the first boot loader 154, the second boot loader 171, etc. have been explained. These programs are read by the CPU 110 and executed by the CPU 110 (the OS execution unit, the loader execution unit).

In Embodiment 1, there has been described the following multi-OS booting apparatus:

when booting the first OS, the multi-OS booting apparatus which boots the second OS by using the first memory space from which the second memory space used by the second OS has been excluded so that the second memory space may not managed by the first OS, including the first boot loader and the second boot loader described below:

(a) the first boot loader to load the second boot loader being a program for loading the second OS and the second OS image into the first memory space by using the file reading procedure of the first OS, and (b) the second boot loader, being a program booted by the first boot loader and being in the first memory space, to operate in the third memory space including the first memory space where the second OS image is loaded and the second memory space, to load the loaded second OS image into the second memory space, and to boot the second OS.

In Embodiment 2, there has been described the multi-OS booting apparatus including the following means:

the OS decrypting/loading unit of the second boot loader, which includes a means to decrypt an encrypted second OS image or develop a compressed second OS, and to load it into the second memory space.

In Embodiment 2, there has been described the multi-OS booting apparatus including the following means (falsification checking unit):

the falsification checking unit of the second boot loader to stop loading of the second OS when the second OS image has been fraudulently falsified.

In Embodiment 2, there has been described the multi-OS booting apparatus including the following means (duplication checking unit):

the duplication checking unit of the second boot loader, which includes a means to previously embed hardware information (serial number, MAC address, etc.) that can be checked from the software by the hardware included in the computer, in the second OS image, to compare the embedded information with information acquired from the hardware when loading the second OS, and to allow booting the second OS only when the compared information are in accordance with each other.

EXPLANATION OF REFERENCE

100 Computer, 110 CPU, 111 Register Group, 112 PTBR, 113 MMU, 120 Primary Storage Device, 130 Secondary Storage Device, 131 Second OS Image, 132 First Boot Loader Executable File, 133 Second Boot Loader Executable File, 140 I/O Device, 150 First Memory Space, 151 First OS, 152 First Page Table, 153 File System Driver, 154 First Boot Loader, 155 File Load Unit, 160 Second Memory Space, 161 Second OS, 162 Second Page Table, 170 Third Memory Space, 171 Second Boot Loader, 172 Third Page Table, 173 Context Generating Unit, 174 Context Changing Unit, 175 OS Loading Unit, 176 OS Booting Unit

The invention claimed is:

1. A multi-OS booting apparatus which boots at least two operating systems (operating system hereinafter called an OS) of a first OS and a second OS, comprising:

(1) a primary storage unit having a memory area with respect to which a memory space is defined;

(2) a secondary storage unit for storing a second boot loader and the second OS;

(3) an OS execution unit for causing a first boot loader to perform loading the second boot loader and the second OS from the secondary storage unit into the memory area of the primary storage unit, which is defined as a first memory space managed by the first OS with respect to the primary storage device by a first context, wherein the loading is performed by running the first boot loader, which is to run under the first OS that operates in the first context being a context indicating control information for a CPU (Central Processing Unit) and being a context for the first OS, under the first OS operating in the first context; and (4) a loader execution unit for causing the second boot loader to generate a context for the second boot loader, which defines a third memory space with respect to the primary storage unit, wherein the third memory space includes a memory area defined as a second memory space managed by the second OS and a memory area where the second boot loader and the second OS have been loaded, and to perform switching from the first context to the context generated for the second boot loader, by executing the second boot loader, which has been loaded into the memory area defined as the first memory space, under the first OS operating in the first context, for causing the second boot loader to load the second OS, which has been loaded into the memory area of the primary storage unit by the first boot loader, into the memory area of the primary storage unit defined as the second memory space included in the third memory space, and to generate a context for the second OS, by executing the second boot loader in the context for the second boot loader, and for causing the second boot loader to perform switching from the context for the second loader to the context generated for the second OS, and to boot the second OS in the context for the second OS.

2. The multi-OS booting apparatus according to claim 1, wherein the second OS stored in the secondary storage unit has been encrypted, the second boot loader stored in the secondary storage unit has a function of decrypting an encrypted second OS, and the loader execution unit causes the second boot loader to decrypt the encrypted second OS which has been loaded into the memory area of the primary storage unit by the first boot loader, and to load a decrypted second OS into the memory area of the primary storage unit defined as the second memory space included in the third memory space, by executing the second boot loader in the context for the second boot loader.

3. The multi-OS booting apparatus according to claim 1, wherein the second boot loader stored in the secondary storage unit has a function of checking for falsification of the second boot loader, and the loader execution unit causes the second boot loader to determine whether the second boot loader itself has been falsified, by executing the second boot loader under the first OS operating in the first context.

4. The multi-OS booting apparatus according to claim 1, wherein the second boot loader stored in the secondary storage unit has a function of checking for falsification of the second OS, and the loader execution unit causes the second boot loader to determine whether the second OS, which has been loaded into the memory area of the primary storage unit by the first boot loader, has been falsified, by executing the second boot loader in the context for the second boot loader.

5. The multi-OS booting apparatus according to claim 1, wherein the second boot loader stored in the secondary storage unit has a function of checking whether the second OS is a duplicate, and the loader execution unit causes the second boot loader to determine whether the second OS, which has been loaded into the memory area of the primary storage unit by the first boot loader, has been duplicated, by executing the second boot loader in the context for the second boot loader.

6. A non-transitory computer-readable storage medium storing a multi-OS booting program that causes a computer which boots at least two operating systems (operating system hereinafter called an OS) of a first OS and a second OS to function as:

(1) a primary storage unit having a memory area with respect to which a memory space is defined;

(2) a secondary storage unit for storing a second boot loader and the second OS;

(3) an OS execution unit for causing a first boot loader to perform loading the second boot loader and the second OS from the secondary storage unit into the memory area of the primary storage unit, which is defined as a first memory space managed by the first OS with respect to the primary storage device by a first context, wherein the loading is performed by running the first boot loader, which is to run under the first OS that operates in the first context being a context indicating control information for a CPU (Central Processing Unit) and being a context for the first OS, under the first OS operating in the first context; and (4) a loader execution unit for causing the second boot loader to generate a context for the second boot loader, which defines a third memory space with respect to the primary storage unit, wherein the third memory space includes a memory area defined as a second memory space managed by the second OS and a memory area where the second boot loader and the second OS have been loaded, and to perform switching from the first context to the context generated for the second boot loader, by executing the second boot loader, which has been loaded into the memory area defined as the first memory space, under the first OS operating in the first context, for causing the second boot loader to load the second OS, which has been loaded into the memory area of the primary storage unit by the first boot loader, into the memory area of the primary storage unit defined as the second memory space included in the third memory space, and to generate a context for the second OS, by executing the second boot loader in the context for the second boot loader, and for causing the second boot loader to perform switching from the context for the second loader to the context generated for the second OS, and to boot the second OS in the context for the second OS.

7. A multi-OS booting method performed by a multi-OS booting apparatus that includes a primary storage unit having a memory area with respect to which a memory space is defined, and boots at least two operating systems (operating system hereinafter called an OS) of a first OS and a second OS, comprising:

(1) storing a second boot loader and the second OS by a secondary storage unit;

(2) causing a first boot loader, by an OS execution unit, to perform loading the second boot loader and the second OS from the secondary storage unit into the memory area of the primary storage unit, which is defined as a first memory space managed by the first OS with respect to the primary storage device by a first context, wherein the loading is performed by running the first boot loader, which is to run under the first OS that operates in the first context being a context indicating control information for a CPU (Central Processing Unit) and being a context for the first OS, under the first OS operating in the first context; and (3) causing the second boot loader, by a loader execution unit, to generate a context for the second boot loader, which defines a third memory space with respect to the primary storage unit, wherein the third memory space includes a memory area defined as a second memory space managed by the second OS and a memory area where the second boot loader and the second OS have been loaded, and to perform switching from the first context to the context generated for the second boot loader, by executing the second boot loader, which has been loaded into the memory area defined as the first memory space, under the first OS operating in the first context, causing the second boot loader to load the second OS, which has been loaded into the memory area of the primary storage unit by the first boot loader, into the memory area of the primary storage unit defined as the second memory space included in the third memory space, and to generate a context for the second OS, by executing the second boot loader in the context for the second boot loader, and causing the second boot loader to perform switching from the context for the second loader to the context generated for the second OS, and to boot the second OS in the context for the second OS.

* * * * *